(12) United States Patent
Ko

(10) Patent No.: US 7,669,677 B2
(45) Date of Patent: Mar. 2, 2010

(54) INSULATOR FOR VEHICULAR RADIATOR

(75) Inventor: Hyun-Bae Ko, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 942 days.

(21) Appl. No.: 11/169,985

(22) Filed: Jun. 28, 2005

(65) Prior Publication Data

US 2005/0284868 A1 Dec. 29, 2005

(30) Foreign Application Priority Data

Jun. 28, 2004 (KR) .................. 10-2004-0048850

(51) Int. Cl.
*B60K 11/04* (2006.01)
(52) U.S. Cl. .................................... 180/68.4
(58) Field of Classification Search ............. 165/68, 165/69; 180/68.4; 248/609; 267/136, 140, 267/140.13
See application file for complete search history.

(56) References Cited

U.S. PATENT DOCUMENTS

| 5,123,625 A * | 6/1992 | Spaltofski ............. 248/634 |
| 5,758,860 A * | 6/1998 | Hanazaki et al. ............. 248/634 |
| 6,158,726 A * | 12/2000 | Coleman et al. ............. 267/292 |
| 6,456,455 B2 * | 9/2002 | McCutcheon et al. ..... 360/98.08 |
| 6,683,840 B2 * | 1/2004 | Shin ........................... 720/698 |

FOREIGN PATENT DOCUMENTS

JP 06064453 A * 3/1994

* cited by examiner

*Primary Examiner*—S. Joseph Morano
*Assistant Examiner*—Katy Meyer
(74) *Attorney, Agent, or Firm*—Morgan, Lewis & Bockius LLP

(57) ABSTRACT

The vibration of a radiator is insulated from being transmitted to a vehicle body by an insulator having vibration-dampening protrusions, air pockets, and sub-air pockets, thereby greatly reducing noise and vibration of the vehicle compartment. The insulator includes an insertion portion, flange, supporting portion, coupling hole, air pockets, and vibration-dampening protrusions.

11 Claims, 2 Drawing Sheets

INSULATOR FOR VEHICULAR RADIATOR

CROSS-REFERENCE TO RELATED APPLICATIONS

The present application is based on, and claims priority from, Korean Application Serial Number 10-2004-0048850, filed on Jun. 28, 2004, the disclosure of which is hereby incorporated by reference herein in its entirety.

FIELD OF THE INVENTION

The present invention relates to an insulator for a vehicular radiator. More particularly, the present invention relates to a structure of an insulator that is disposed between a radiator and vehicle body for isolating vibration therebetween.

BACKGROUND OF THE INVENTION

Typically, a radiator is mounted with a cooling fan and can vibrate due to operation of the cooling fan. Such vibration may be transmitted to the vehicle compartment through the vehicle body that supports the radiator.

Thus, an insulator is required for isolating the vibration of the radiator between the radiator and vehicle body and for minimizing noise and vibration of the vehicle compartment thereby.

SUMMARY OF THE INVENTION

Embodiments of the present invention are provided to effectively prevent vibration of a radiator from being transmitted to the vehicle body by installing an insulator between the radiator and vehicle body, thereby reducing noise and vibration of the vehicle compartment.

An insulator for a vehicular radiator includes an insertion portion that has a cylindrical shape for being inserted into an insertion hole of a vehicle body. A flange having a larger diameter than that of the insertion hole protrudes outward from the insertion portion along a circumferential direction thereof. A supporting portion having a smaller diameter than that of the flange protrudes out from an upper surface of the flange and is formed in a cylindrical shape for supporting a lower portion of a radiator. A coupling hole penetrating from the supporting portion to the insertion portion is formed to be inserted by a mounting protrusion that protrudes out at a bottom of the radiator. A plurality of air pockets have opened upper ends and are formed at the supporting portion along a circumferential direction thereof. A plurality of vibration-dampening protrusions are positioned at the supporting portion along a circumferential direction thereof.

In a further alternative embodiment, an insulator for a vehicle radiator comprises an annular body formed of a resilient material. Preferably the body includes a lower insertion portion having a first diameter, an intermediate flange portion having a second diameter greater than the first diameter, and an upper supporting portion having a third diameter less than the second diameter. The upper supporting portion defines a plurality of circumferentially spaced air pockets opening on an upper surface thereof and a plurality of protrusions on the upper surface. The protrusions are spaced between the air pockets. In a further preferred embodiment, the plurality of air pockets and protrusions are alternatingly formed with a constant distance therebetween. Also, preferably, as viewed from above, each air pocket has an arcuate shape, and as viewed in cross-section, each air pocket has a narrow upper end, expands at a middle portion thereof, and a lower portion is gradually narrowed. In another embodiment, a plurality of sub-air pockets are formed around an inner periphery of said annular body.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
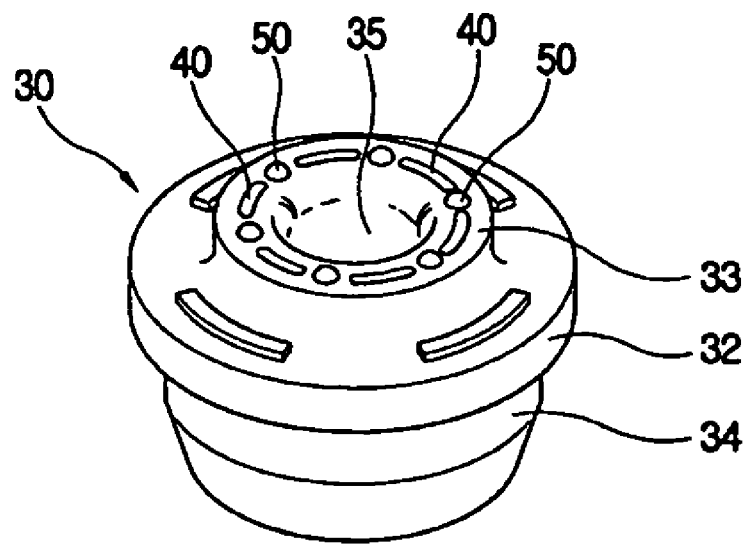
FIG. 1 is a perspective view of an insulator according to an embodiment of the present invention.
Figure 2:
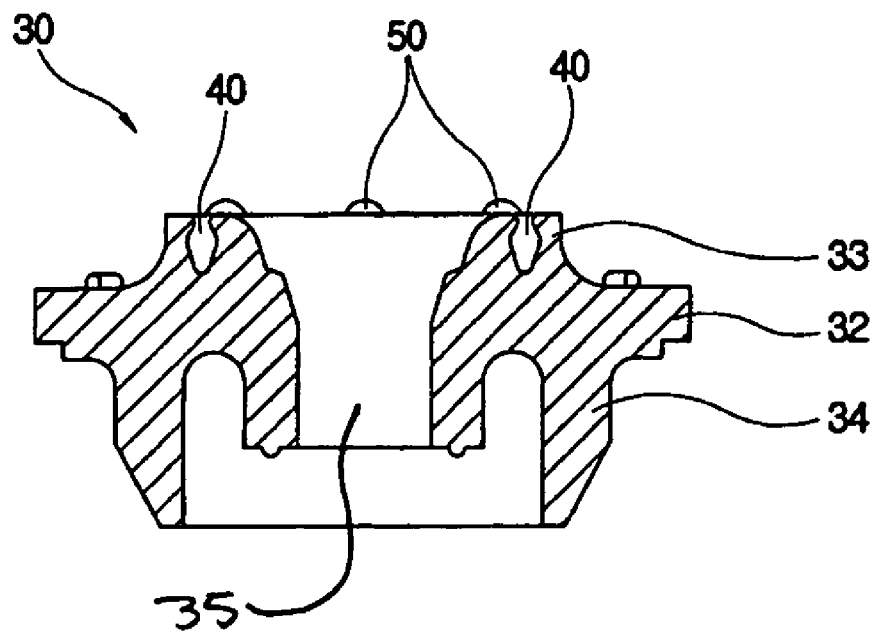
FIG. 2 is a cross-sectional view of the insulator of FIG. 1.
Figure 3:
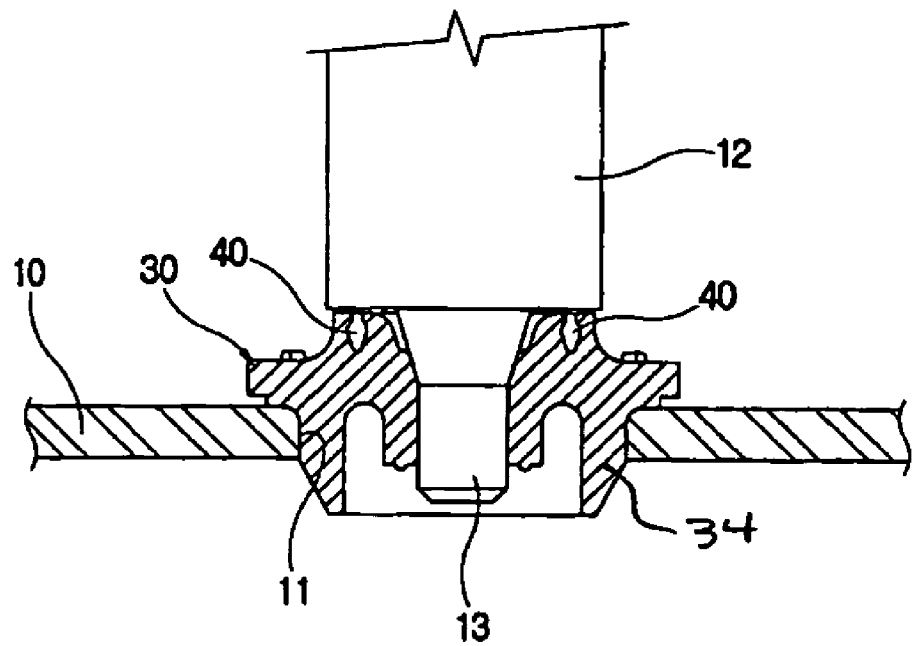
FIG. 3 depicts an operational state of the insulator.

With reference to FIGS. 1 to 3, an insulator 30 according to an embodiment of the present invention includes an insertion portion 34 that has a cylindrical shape for being inserted into an insertion hole 11 of a vehicle body 10. A flange 32 having a larger diameter than that of insertion hole 11 protrudes outward from insertion portion 34 around the circumference thereof. A supporting portion 33 having a smaller diameter than that of flange 32 protrudes from an upper surface of flange 32 and is preferably formed in a cylindrical shape for supporting a lower portion of a radiator 12. A coupling hole 35 penetrating from supporting portion 33 to insertion portion 34 is formed to receive a mounting protrusion 13 that protrudes out at a bottom of a radiator 12. A plurality of air pockets 40 have opened upper ends and are formed at supporting portion 33 along the circumferential direction thereof. A plurality of vibration-dampening protrusions 50 also may be positioned on supporting portion 33 along the circumferential direction thereof.

The plurality of air pockets 40 and vibration-dampening protrusions 50 are alternatively formed with a constant distance therebetween. However, two to three vibration-dampening protrusions 50 may preferably be formed between two air pockets 40. When observed from the top, air pocket 40 is in an arc shape along the circumferential direction of supporting portion 33. If observed from the side section, air pocket 40 has a narrow upper end and expands at the middle portion thereof. The lower portion of air pocket 40 is gradually narrowed down in width (see FIG. 2). Vibration-dampening protrusions 50 project outward, preferably in the shape of a half-sphere from the upper surface of supporting portion 33.

Figure 4:
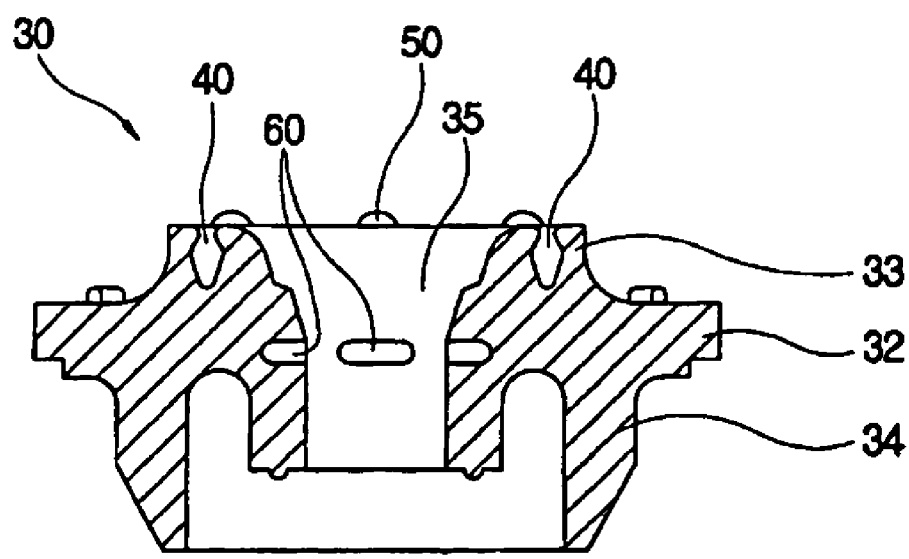
FIG. 4 is a cross-sectional view of another embodiment of the present invention.

Another embodiment of the present invention is illustrated in FIG. 4. A plurality of sub-air pockets 60 are formed in the wall around the periphery of coupling hole 35. The remaining are preferably similar to those of the first embodiment. Air pockets 40 together with sub-air pockets 60 effectively function to absorb the vibration applied to insulator 30.

The plurality of sub-air pockets 60 according to the second embodiment of the present invention are on an imaginary circle within a constant interval therebetween. Thus, sub-air pockets 60 are constantly placed to form a circle at a certain height from the bottom of insertion portion 34.

Referring to FIG. 3, insertion portion 34 of insulator 30 is inserted into insertion hole 11 of vehicle body 10 and is hung at the vehicle body 10 by flange 32. Mounting protrusion 13 of radiator 12 is inserted into coupling hole 35 of insulator 30, and thus the bottom surface of radiator 12 is supported by supporting portion 33. Insulator 30 is suppressed by the weight of radiator 12; however, the bottom portion of radiator 12 is not completely attached onto supporting portion 33 due to vibration-dampening protrusions 50.

Insulator 30 thus constructed absorbs vibration superbly from radiator 12 by using vibration-dampening protrusions 50 and air pockets 40. The elastic characteristic of insulator 30 made of rubber also diminishes the above vibration. Sub-air pockets 60 of FIG. 4 further improve the vibration-absorption of insulator 30.

Insulator 30 may be formed of a suitable resilient material, such as rubber or other resilient synthetic material, selected by a person of ordinary skill in the art based on the teachings herein and operational factors such as temperature and exposure to engine lubricants and other fluids, etc.

As apparent from the foregoing, there is an advantage in that an insulator formed with vibration-dampening protrusions, air pockets, and sub-air pockets effectively prevents vibration of a radiator from being transmitted to the vehicle body, hence greatly reducing noise and vibration of the vehicle compartment.

What is claimed is:

1. An insulator for a vehicular radiator, comprising:
   an insertion portion that has a cylindrical shape for being inserted into an insertion hole of a vehicle body;
   a flange having a larger diameter than that of said insertion portion and protruding outward from said insertion portion along a circumference thereof;
   a supporting portion having a smaller diameter than that of said flange and protruding from an upper surface of said flange, said supporting portion being formed in a cylindrical shape for supporting a lower portion of a radiator;
   a coupling hole penetrating from said supporting portion to said insertion portion and being formed for receiving a radiator mounting protrusion;
   a plurality of air pockets formed in said supporting portion along a circumferential direction thereof, comprising opened upper ends and otherwise enclosed on all sides by the supporting portion; and
   a plurality of vibration-dampening protrusions positioned at said supporting portion along a circumferential direction thereof,
   wherein said plurality of air pockets and vibration-dampening protrusions are alternately formed with a constant distance therebetween.

2. The insulator as defined in claim 1, wherein, when observed from the top, said air pocket is in an arc shape, and if observed from a side section, said air pocket has a narrow upper end and expands at a middle portion thereof and a lower portion of said air pocket is gradually narrowed down in width.

3. The insulator as defined in claim 1, wherein said vibration-dampening protrusion projects outward in the shape of a half-sphere from an upper surface of said supporting portion.

4. The insulator as defined in claim 1, further comprising a plurality of sub-air pockets formed around an inner periphery of said coupling hole.

5. The insulator as defined in claim 4, wherein said plurality of sub-air pockets are on an imaginary circle within a constant interval therebetween.

6. An insulator for a vehicle radiator, comprising an annular body formed of a resilient material, said body including;
   a lower insertion portion having a first diameter;
   an intermediate flange portion having a second diameter greater than the first diameter; and
   an upper supporting portion having a third diameter less than the second diameter, wherein said upper supporting portion defines a plurality of circumferentially spaced air pockets opened on an upper surface thereof and otherwise enclosed on all sides by the supporting portion, and a plurality of protrusions on said upper surface, said protrusions spaced between said air pockets.

7. The insulator as defined in claim 6, wherein said plurality of air pockets and said protrusions are alternatingly formed with a constant distance therebetween.

8. The insulator as defined in claim 7, wherein, as viewed from above, each said air pocket has an arcuate shape, and as viewed in cross-section, each said air pocket has a narrow upper end, expands at a middle portion thereof, and a lower portion is gradually narrowed.

9. The insulator as defined in claim 6, further comprising a plurality of sub-air pockets formed around an inner periphery of said annular body.

10. The insulator as defined in claim 1, comprising a single material.

11. The insulator as defined in claim 6, comprising a single material.

* * * * *